US009277593B2

(12) United States Patent
Kim et al.

(10) Patent No.: US 9,277,593 B2
(45) Date of Patent: Mar. 1, 2016

(54) DOWNLINK TRANSMISSION/RECEPTION METHOD AND APPARATUS FOR MOBILE COMMUNICATION SYSTEM

(75) Inventors: Younsun Kim, Seongnam-si (KR); Jinkyu Han, Seoul (KR); Joonyoung Cho, Suwon-si (KR); Youngbum Kim, Seoul (KR); Taeyoung Kim, Seongnam-si (KR); Hyojin Lee, Seoul (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 13/416,263

(22) Filed: Mar. 9, 2012

(65) Prior Publication Data
US 2012/0230270 A1 Sep. 13, 2012

(30) Foreign Application Priority Data

Mar. 10, 2011 (KR) ........................ 10-2011-0021332

(51) Int. Cl.
*H04W 4/00* (2009.01)
*H04W 99/00* (2009.01)
*H04L 27/26* (2006.01)
*H04W 84/04* (2009.01)
*H04W 88/08* (2009.01)

(52) U.S. Cl.
CPC ........... *H04W 99/00* (2013.01); *H04L 27/2607* (2013.01); *H04W 84/045* (2013.01); *H04W 88/08* (2013.01)

(58) Field of Classification Search
CPC ... H04W 84/045; H04W 99/00; H04W 88/08; H04W 28/06; H04W 28/08; H04L 5/0007; H04L 27/2607; H04L 5/0048; H04L 5/001; H04L 5/0023; H04L 5/0091
USPC ................................................ 370/310.2, 328
See application file for complete search history.

(56) References Cited

U.S. PATENT DOCUMENTS

| | | | | |
|---|---|---|---|---|
| 2004/0037215 A1* | 2/2004 | Hwang et al. | ................. | 370/203 |
| 2008/0084815 A1* | 4/2008 | Shin | .............. | 370/203 |
| 2009/0268837 A1* | 10/2009 | Kimura et al. | ................ | 375/267 |
| 2009/0303960 A1* | 12/2009 | Qu et al. | ....................... | 370/330 |
| 2010/0067514 A1* | 3/2010 | Luo | ......................... | H04L 23/02 370/342 |
| 2011/0032850 A1* | 2/2011 | Cai | .............................. | 370/280 |
| 2011/0044259 A1* | 2/2011 | Nimbalker | .............. | H04L 5/001 370/329 |

(Continued)

FOREIGN PATENT DOCUMENTS

KR 10-2009-0079151 A 7/2009
KR 10-2010-0038129 A 4/2010

(Continued)

*Primary Examiner* — Hoang-Chuong Vu
(74) *Attorney, Agent, or Firm* — Jefferson IP Law, LLP

(57) ABSTRACT

A downlink transmission/reception apparatus and a method are provided for improving a data rate in a mobile communication based on Orthogonal Frequency Division Multiple Access (OFDMA). The downlink transmission method of a base station in a mobile communication system including at least one femto cell deployed in a macro cell includes generating signals to be mapped to at least one short symbol and a plurality of long symbols in a second type of subframe for the femto cell which differs from a first type of subframe for the macro cell in frequency, the first and second types of subframes being identical with each other in the time domain, and transmitting the at least one short symbol and the plurality of long symbols at predetermined positions in the second type of subframe.

16 Claims, 13 Drawing Sheets

(56) References Cited

U.S. PATENT DOCUMENTS

2012/0039221 A1    2/2012    Lim et al.
2012/0087257 A1*    4/2012    Larsson et al. ............... 370/252
2013/0242924 A1*    9/2013    Kim et al. .................... 370/329
2013/0286907 A1*    10/2013    Wei et al. ..................... 370/281

FOREIGN PATENT DOCUMENTS

KR    10-2010-0038130 A    4/2010
KR    10-2010-0121392 A    11/2010

* cited by examiner

DOWNLINK TRANSMISSION/RECEPTION METHOD AND APPARATUS FOR MOBILE COMMUNICATION SYSTEM

PRIORITY

This application claims the benefit under 35 U.S.C. §119 (a) of a Korean patent application filed on Mar. 10, 2011 in the Korean Intellectual Property Office and assigned Serial No. 10-2011-0021332, the entire disclosure of which is hereby incorporated by reference.

BACKGROUND OF THE INVENTION

1. Field of the Invention

The present invention relates to mobile communications. More particularly, the present invention relates to a downlink transmission/reception apparatus and method for a mobile communication based on Orthogonal Frequency Division Multiple Access (OFDMA).

2. Description of the Related Art

Mobile communication systems have evolved beyond the early voice-oriented services and now include a high-speed, high-quality wireless packet data communication system to provide data and multimedia services. In this regard, various mobile communication standards, such as High Speed Downlink Packet Access (HSDPA), High Speed Uplink Packet Access (HSUPA), Long Term Evolution (LTE), and LTE-Advanced (LTE-A), defined in the $3^{rd}$ Generation Partnership Project (3GPP), High Rate Packet Data (HRPD) defined in the $3^{rd}$ Generation Partnership Project-2 (3GPP2), and 802.16 defined by the Institute of Electrical and Electronics Engineers (IEEE), have been developed to support the high-speed, high-quality wireless packet data communication services. More particularly, LTE has been developed and is the most promising technology that is capable of facilitating the high speed packet data transmission and maximizing the throughput of the radio communication system with various radio access technologies. LTE-A is the evolved version of LTE to improve the data transmission capability.

LTE corresponds to the 3GPP release 8 and release 9 standards while LTE-A corresponds to the release 10 standard. The 3GPP continues to study further advancements for LTE-A and to release standards following LTE-A.

The existing $3^{rd}$ generation wireless packet data communication systems, such as HSDPA, HSUPA and HRPD, use technologies such as Adaptive Modulation and Coding (AMC) and Channel-Sensitive Scheduling to improve the transmission efficiency. With the use of AMC, a transmitter can adjust an amount of data transmission according to the channel state. That is, when the channel state is 'Bad', the transmitter reduces the amount of data for transmission to match the reception error probability to a desired level, and when the channel state is 'Good', the transmitter increases the amount of data for transmission to transmit a large volume of information efficiently while matching the reception error probability to the desired level.

Using the channel-sensitive scheduling resource management method, the transmitter, since it selectively services a user having a superior channel state among several users, can increase the system capacity, as compared with a transmitter that allocates a channel to one user and services the user with the allocated channel. Such capacity increase is commonly referred to as a multi-user diversity gain. In brief, the AMC method and the channel-sensitive scheduling method are methods for receiving partial channel state information being fed back from a receiver, and applying an appropriate modulation and coding technique at the most efficient time that is determined depending on the received partial channel state information.

LTE and LTE-A have adopted Orthogonal Frequency Division Multiple Access (OFDMA) as the multiple channel access mechanism. The 3GPP and 3GPP2 have adopted OFDMA for the advanced systems. OFDMA is expected to provide superior system throughput as compared to Code Division Multiple Access (CDMA). One of the main factors that allows OFDMA to increase system throughput is the frequency domain scheduling capability. As channel sensitive scheduling increases the system capacity using the time-varying channel characteristic, OFDMA can be used to obtain more capacity gain using the frequency-varying channel characteristic.

In order to expand the total service coverage area, a cellular mobile communication system operates with a plurality of cells that provide terminals with a communication service within the service coverage area of each cell.

FIG. 1 is a diagram illustrating a cellular concept of a mobile communication system according to the related art.

Referring to FIG. 1, a cellular system including three cells is illustrated. Each cell is provided with a transceiver facility to provide a terminal (e.g., User Equipment (UE)) with mobile communication service within the service coverage area of the cell. Each of the transceiver facilities of the base stations (e.g., evolved Node Bs (eNBs)) 100, 110, and 120 have service coverage areas with a radius of a few hundred to a few thousand meters.

Such a cellular topology is advantageous to provide mobile communication service over a large area. At the initial system configuration stage, a plurality of base stations are deployed to secure a large service coverage area (i.e., service provision area) as shown in FIG. 1. As the use and amount of mobile data increases, the mobile communication system evolves to meet the user requirements. The system evolvement is achieved with the miniaturization of the cell size as well as the adoption of new transmission techniques and an increase in the number of antennas. For example, femto cells are deployed at hot spots accommodating a high volume of data traffic.

FIG. 2 is a diagram illustrating an architecture of a mobile communication system according to the related art.

Referring to FIG. 2, a cellular communication system having a plurality of femto cells deployed within the macro cells is illustrated.

In FIG. 2, a plurality of small cells 240 are deployed in the macro cells 230 formed by the base station transceiver facilities 200, 210, and 220. The femto cells 240 provide the terminals with mobile communication service within their service areas at low transmit power. A femto cell 240 and a macro cell 230 have the following differences:

The femto cell 240 performs downlink transmission at low transmit power while the macro cell 230 performs downlink transmission at higher transmit power.

The femto cell 240 is deployed to provide service to terminals moving in a small area at low mobility while the macro cell 230 is deployed to provide service to terminals moving in a relatively large area at high mobility.

The difference in transmit power between the femto and macro cells influences the delay spread of a signal propagating over a radio channel to some extent. The delay spread corresponds to the time delay between the arrival time of a signal that has been reflected by various obstacles. The delay spread can be influenced by the signal's transmit power because the magnitude of the signal's reflectance corresponds to the amount of power used to transmit the signal. That is, the higher the transmit power, the farther the reflected signal. In contrast, a lower transmit power results in less reflectance and hence a shorter delay spread.

The difference in mobility supported between the femto and macro cell is required because the macro cell 230 has to provide a mobile communication service commonly to all of the terminals within the cell coverage regardless of the mobility category of the terminals. Typically, a femto cell 240 aims to provide a mobile communication service in a population density area such as a downtown area, a shopping mall, a sports complex, and the like, while the macro cell 230 aims to provide a mobile communication service within a relatively large service coverage area even to a terminal in a vehicle moving on the highway at high speed. The speed of the terminal determines whether the signal arriving at the terminal experiences a certain fading in time. In the case of a terminal moving at low speed, the delay spread can be assumed unchangeable in the transmit time interval as the unit of signal transmission of the base station. Oppositely, in the case of a terminal moving at high speed, the delay spread may change irregularly in the transmit time interval of the base station, resulting in fading.

Since the downlink signal received by the terminal experiences different radio channels according to whether it is received in the femto cell 240 or the macro cell 230, as a consequence, the received signal is distorted. The delay spread is relatively short in the femto cell 240 with regular fading in the transmit time duration while it is relatively long in the macro cell 230 with irregular fading in the transmit time interval.

In a common mobile communication system, the macro and femto cells 230 and 240 operate using the same mobile communication protocol. That is, the downlink transmission is performed in the same frame format in both the macro and femto cells 230 and 240. In the case of the macro cell 230, it is necessary to allocate a large amount of radio resources to overcome a relatively long delay spread and the time-varying fading in the transmit time interval. For example, OFDMA, which is used as the multiple access of LTE/LTE-A as the 4$^{th}$ generation mobile communication standard, uses $\frac{1}{15}$ of the entire radio resource for suppressing the performance degradation caused by the delay spread. Also, in order to compensate for the time varying fading in the transmit time interval, $\frac{1}{3}$ of the entire radio resource is used. The resource assignment for overcoming the delay spread or time varying fading in the transmit time interval results in the reduction of the amount of resources available for real data transmission. It degrades the resource utilization efficiency to perform the downlink transmission with the same frame format in the macro and femto cells 230 and 240 regardless of the different transmission environment of the macro and femto cells.

SUMMARY OF THE INVENTION

Aspects of the present invention are to address at least the above-mentioned problem and/or disadvantages and to provide at least the advantages described below. Accordingly, an aspect of the present invention is to provide a method to increase a transmission data rate by defining a downlink frame format optimized for use in a femto cell.

In accordance with an aspect of the present invention, a downlink transmission method of a base station in a mobile communication system including at least one femto cell deployed in a macro cell is provided. The method includes generating signals to be mapped to at least one short symbol and a plurality of long symbols in a second type of subframe for the femto cell which differs from a first type of subframe for the macro cell in frequency, the first and second types of subframes being identical with each other in the time domain, and transmitting the at least one short symbol and the plurality of long symbols at predetermined positions in the second type of subframe.

In accordance with another aspect of the present invention, a downlink reception method of a terminal in a mobile communication system including at least one femto cell deployed in a macro cell is provided. The method includes determining a second type of subframe which differs from a first type of subframe for the macro cell in frequency and position of at least one short symbol in a second type subframe, the first and second types of subframes being identical with each other in the time domain, and receiving signals mapped to the at least one short symbol and a plurality of long symbols in the second type of subframe according to information on the position.

In accordance with another aspect of the present invention, a downlink transmission apparatus of a base station in a mobile communication system including at least one femto cell deployed in a macro cell is provided. The apparatus includes a signal generator which generates signals to be mapped to at least one short symbol and a plurality of long symbols in a second type of subframe for the femto cell which differs from a first type of subframe for the macro cell in frequency, the first and second types of subframes being identical with each other in the time domain, and a multiplexer which multiplexes the at least one short symbol and the plurality of long symbols at predetermined positions in the second type of subframe.

In accordance with still another aspect of the present invention, a downlink reception apparatus of a terminal in a mobile communication system including at least one femto cell deployed in a macro cell is provided. The apparatus includes a controller which determines a second type of subframe which differs from a first type of subframe for the macro cell in frequency and position of at least one short symbol in the second type of subframe, the first and second types of subframes being identical with each other in the time domain, and a signal receiver which receives signals mapped to the at least one short symbol and a plurality of long symbols in the second subframe according to information on the position.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although a description of exemplary embodiments of the present invention is given herein with reference to an Orthogonal Frequency Division Multiple Access (OFDMA)-based radio communication system, more particularly a $3^{rd}$ Generation Partnership Project (3GPP) Evolved Universal Terrestrial Radio Access (E-UTRA) standard system, it will be understood by those skilled in the art that the present invention can be applied to other communication systems having a similar technical background and channel format, with slight modifications, without departing from the spirit and scope of the present invention.

As aforementioned, a macro cell is advantageous to provide the high mobility User Equipment (UE) with a mobile communication service across a large service area, while a femto cell is advantageous to provide a low mobility UE with advanced data communication service within a smaller service area. In order to achieve the advantages of the macro and femto cells, a technique referred to as Enhanced Data Carrier (EDC) is proposed according to exemplary embodiments of the present invention.

Figure 1:
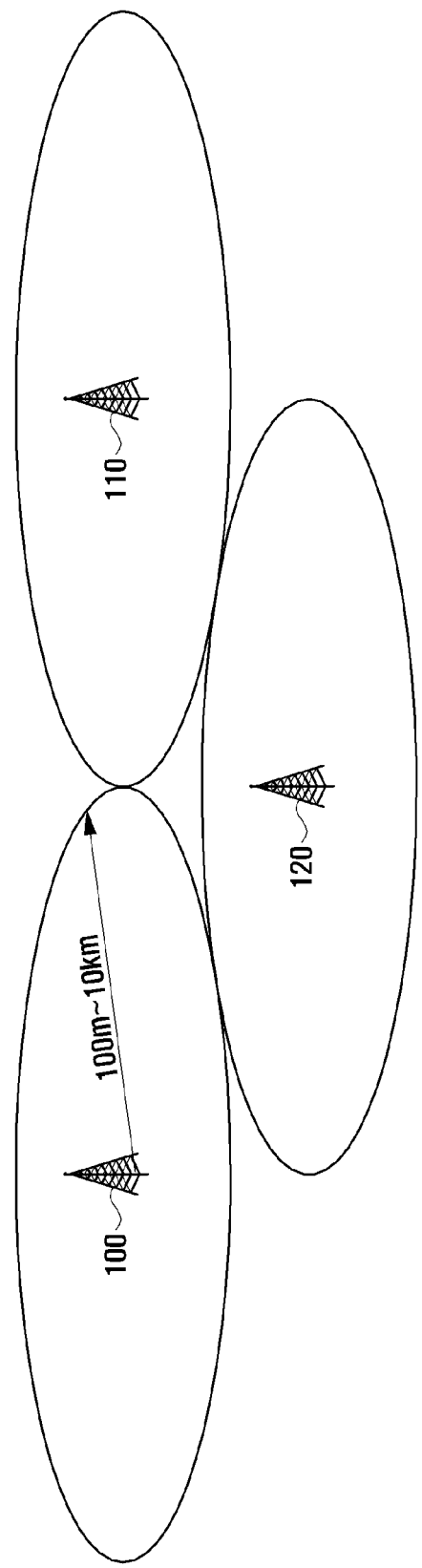
FIG. 1 is a diagram illustrating a cellular concept of a mobile communication system according to the related art.
Figure 2:
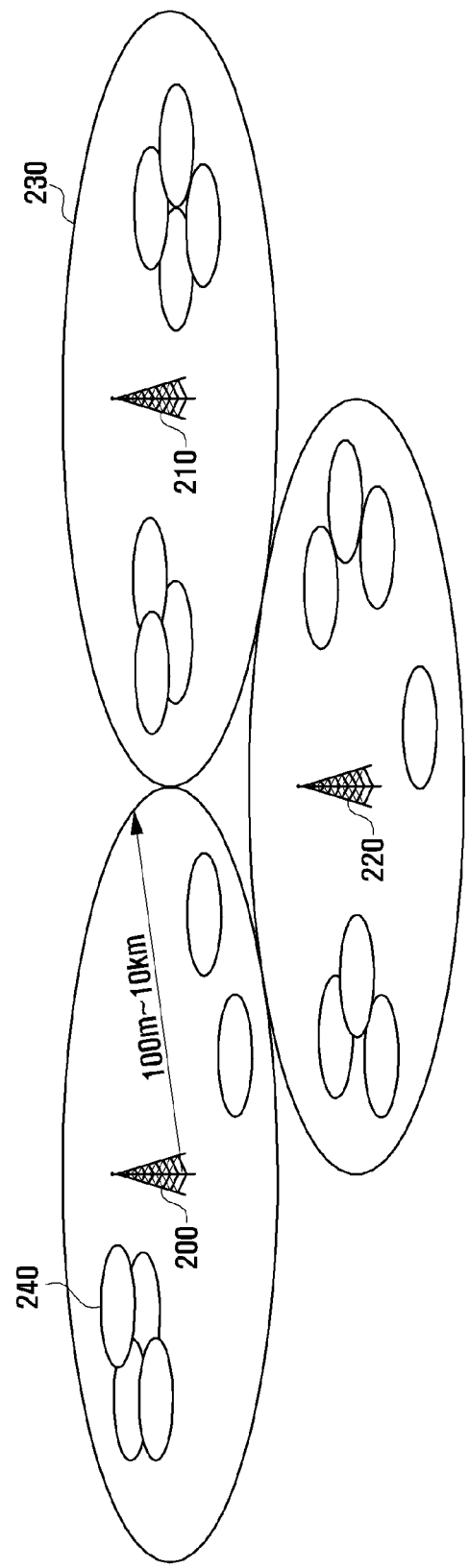
FIG. 2 is a diagram illustrating an architecture of a mobile communication system according to the related art.
Figure 3:
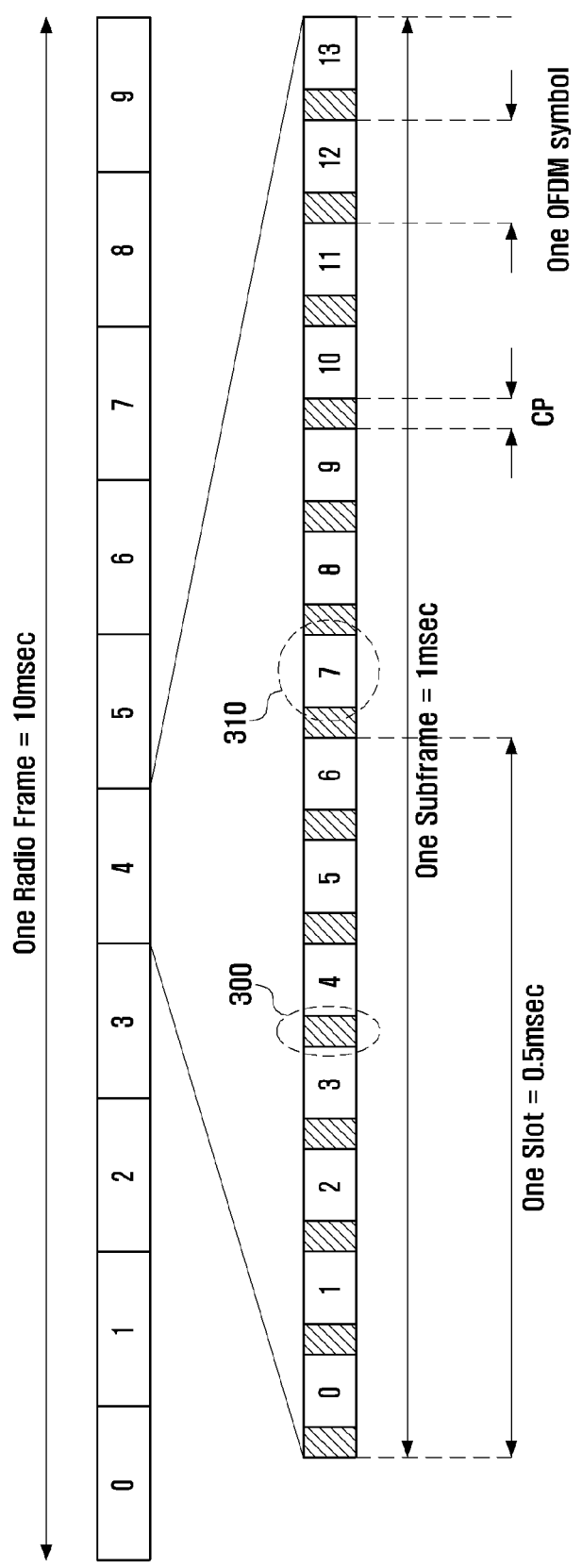
FIG. 3 is a diagram illustrating a downlink frame structure used in a Long Term Evolution/Long Term Evolution-Advanced (LTE/LTE-A) system according to an exemplary embodiment of the present invention.

FIG. 3 is a diagram illustrating a downlink frame structure used in a Long Term Evolution/Long Term Evolution-Advanced (LTE/LTE-A) system according to an exemplary embodiment of the present invention.

Referring to FIG. 3, in the LTE/LTE-A system, a subframe has a length of 1 ms, and 10 subframes form a radio frame spanning 10 msec. One subframe consists of 14 Orthogonal Frequency Division Multiplexing (OFDM) symbols. In order to avoid delay spread, the OFDM symbol can be divided into a Cyclic Prefix (CP) and Inverse Fast Fourier Transform (IFFT) output signal. That is, an OFDM symbol includes a CP duration 300 and a downlink signal duration 310 for the IFFT output signal. The CP duration 300 is a copy of the last part of the IFFT output signals of the downlink signal duration 310 and responsible for avoiding impact of delay spread. The lengths of the downlink signal durations 310 for the IFFT output signal are equal among each other in all of the 14 OFDM symbols. Also, the lengths of the CP signal durations 300 of the 14 OFDM symbols are similar to each other. In more detail, the lengths of the time units used in the LTE/LTE-A system of FIG. 3 are as follows:

1 subframe=1 msec
1 OFDM symbol=72 μsec
1 cyclic prefix=5 μsec

The LTE/LTE-A system has a system bandwidth divided into a plurality of Resource Blocks (RBs) each spanning 180 kHz bandwidth in the frequency domain. One RB consists of 12 consecutive subcarriers in the 180 kHz bandwidth, each subcarrier spanning 15 kHz. In the LTE/LTE-A system, the radio resource is allocated in units of subframes in the time domain and in units of RBs in the frequency domain.

Figure 4:
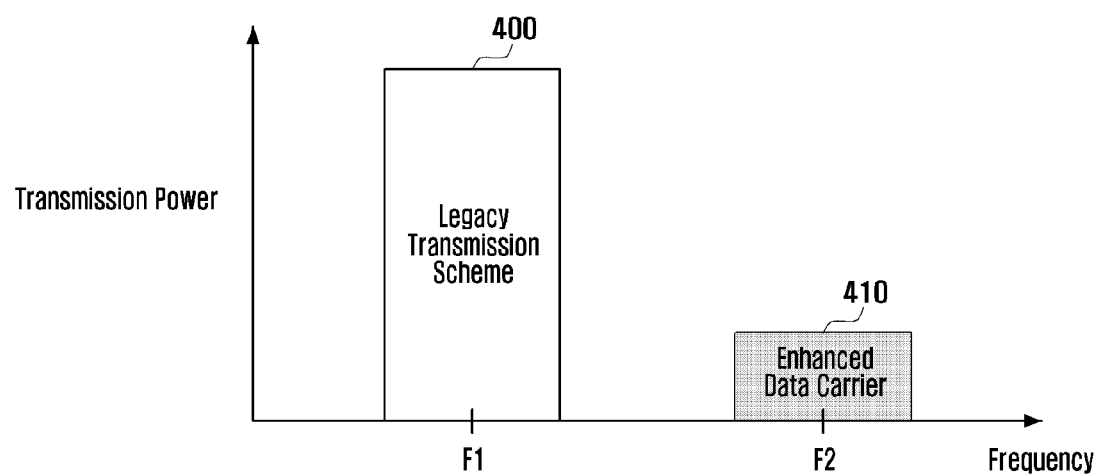
FIG. 4 is a graph illustrating transmit power components according to an exemplary embodiment of the present invention.

FIG. 4 is a graph illustrating transmit power components according to an exemplary embodiment of the present invention.

Referring to FIG. 4, the data signal is transmitted on two frequency bands. The frequency band 400 of center frequency F1 is used for data transmission in the legacy transmission method. The legacy data transmission is performed in the normal downlink frame structure of the LTE/LTE-A system. The normal downlink frame structure is designed for data transmission in a macro cell. In order to serve the UE in the macro cell, the downlink data should be transmitted at relatively high transmit power on the frequency band 400 of F1. Meanwhile, the frequency band 410 of center frequency F2 is used for data transmission in the EDC method. The reason why the data transmission is performed on two different frequency bands 400 and 410 having different center frequencies is to avoid interference between the macro and femto cells arranged adjacently.

Figure 5:
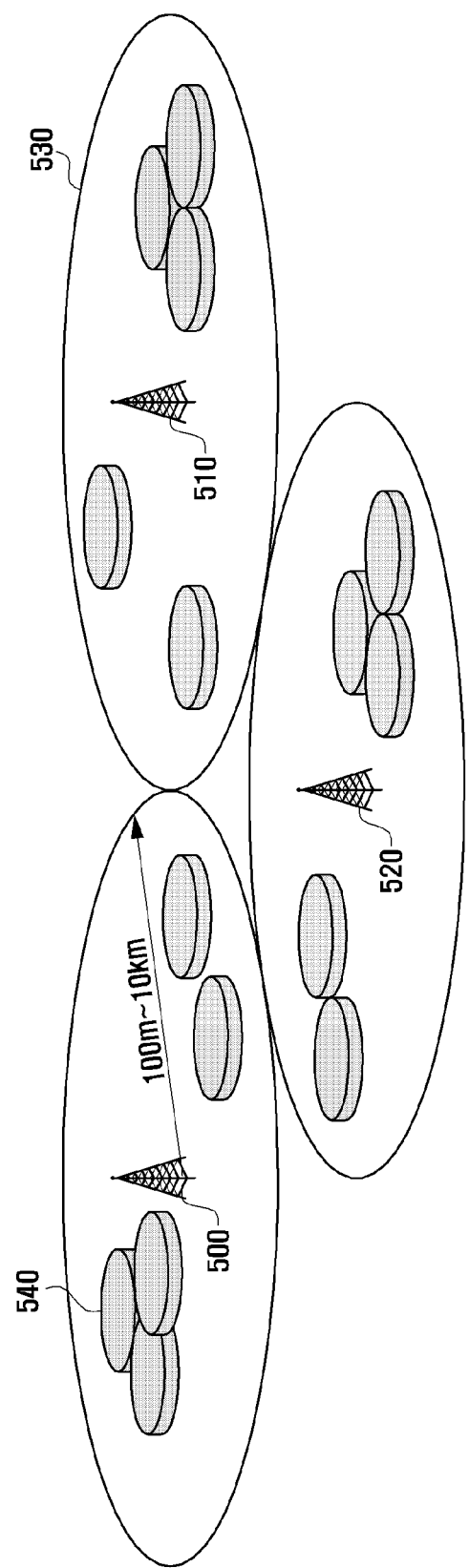
FIG. 5 is a diagram illustrating an architecture of an Enhanced Data Carrier (EDC) system according to an exemplary embodiment of the present invention.

FIG. 5 is a diagram illustrating an architecture of an EDC system according to an exemplary embodiment of the present invention.

Referring to FIG. 5, the system includes macro cells 530 corresponding to transceiver facilities 500, 510, and 520 of the eNBs, and femto cells 540 deployed within the macro cells 530 to operate using an EDC transmission scheme. In an EDC transmission mode, the femto cells 540 provide the mobile communication service on a frequency band different from that of the macro cell 530.

As aforementioned, the EDC communication method is designed in consideration of the radio channel environment in the femto cell 540 unlike the mobile communication method of the related art. In the downlink frame structure for EDC, it is important to reuse the facilities of the LTE/LTE-A system maximally as well as to take the radio channel environment of the femto cell 540 into consideration. In the LTE/LTE-A system, the minimum time unit Ts is defined as follows:

$$Ts = 1/(15000 \times 2048) \approx 32.6 \times 10^{-9} \text{ sec}$$

where Ts has a close relation to the subcarrier spacing, system bandwidth, Analog to Digital and Digital to Analog sampling rates, and the like in the OFDMA transmission scheme of the LTE/LTE-A system. The EDC-enabled UE must also be able to receive the signal transmitted based on the legacy LTE/LTE-A transmission method. That is, the EDC-enabled UE should be configured to receive the EDC transmission signal and LTE/LTE-A transmission signal simultaneously in the same time duration and process these signals separately. This means that the interworking between the EDC system and the LTE/LTE-A system should be considered significantly in designing the EDC system. Another important factor to be considered in designing the EDC system is to reuse the operation hardware of the LTE/LTE-A system as efficiently as possible. In order to address interworking between the EDC and LTE/LTE-A systems and efficient reuse of the operation hardware of the LTE/LTE-A system, an exemplary EDC system of the present invention is designed based on the following conditions.

<Design Conditions>
1. In EDC, one subframe is transmitted in a time duration of X-fold of 1 msec.
2. In EDC, one RB is transmitted on the frequency bandwidth of Y-fold of 180 kHz.
3. In EDC, the number of subcarriers in an RB is Z.

In the design conditions, X, Y, and Z are integers equal to or greater than 1. The first design condition is important for the interworking with the LTE/LTE-A system. Since the downlink radio resource is allocated in units of 1 msec in the LTE/LTE-A system, the subframe of EDC should be designed to have the length equal to or a multiple of 1 msec for interworking. The second and third design conditions are set to reuse the operation hardware of the LTE/LTE-A system as efficiently as possible. In order to maximize the reuse efficiency of the operation hardware of the LTE/LTE-A system, the sampling rate of the transmitter/receiver node of the EDC system should be set to the same value as the LTE/LTE-A system which is achievable by satisfying the second and third design conditions.

Figure 6:
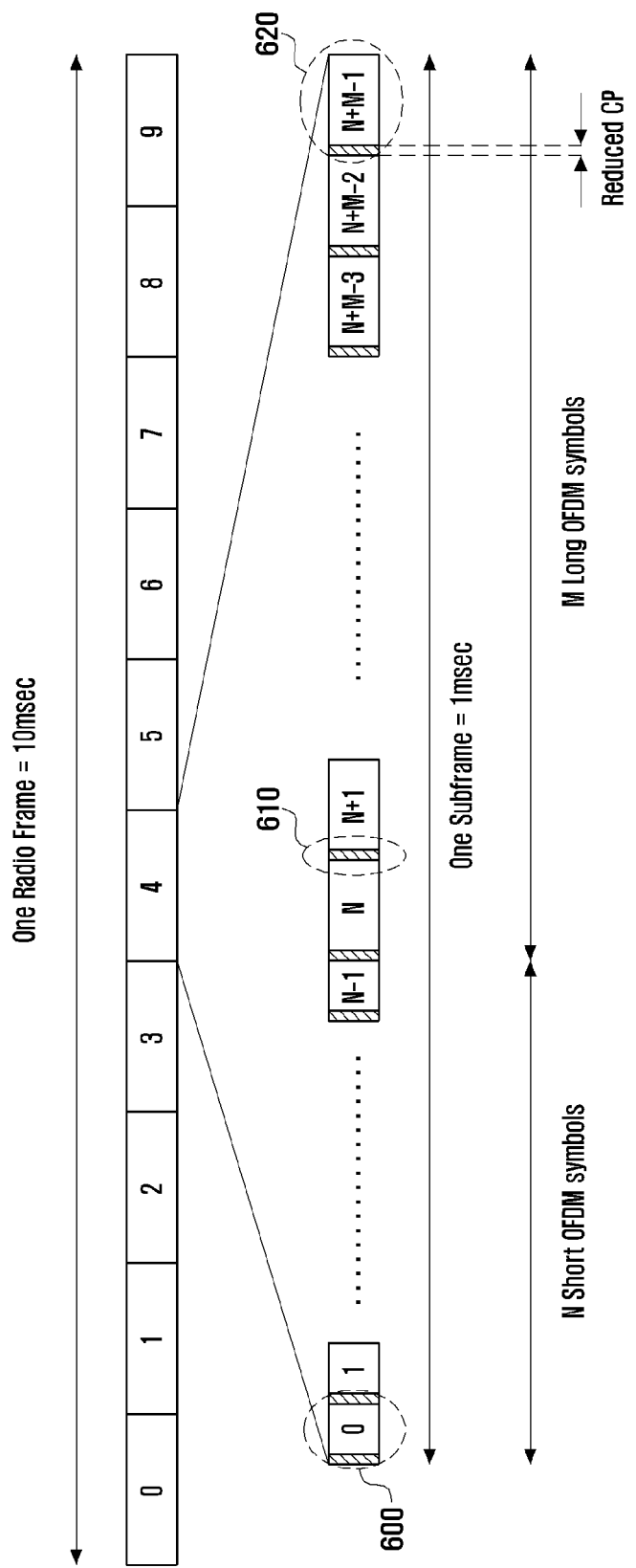
FIG. 6 is a diagram illustrating a downlink frame structure of an EDC system according to an exemplary embodiment of the present invention.

FIG. 6 is a diagram illustrating a downlink frame structure of an EDC system according to an exemplary embodiment of the present invention.

Referring to FIG. 6, the downlink frame of the EDC system differs from that of the LTE/LTE-A in following aspects:
 The cyclic prefix is relatively short.
 OFDM symbols having different lengths are transmitted in a subframe.

The downlink frame format of the EDC system consists of N short OFDM symbols 600 and M long OFDM symbols 620. The cyclic prefix 610 of the EDC system is shorter than that of the LTE/LTE-A system. This means that the EDC system reduces overhead by using the short cyclic prefix.

Table 1 shows a downlink frame format for use in an EDC system with X=1 and Y=1 according to a first exemplary embodiment of the present invention.

TABLE 1

| Time Domain | | Frequency Domain | |
| --- | --- | --- | --- |
| Subframe length | 1 msec | RB bandwidth | 180 kHz |
| # of short OFDM symbols in Subframe (N) | 1 | # of subcarriers per RB for short OFDM symbol | 6 |
| Length of short OFDM symbol | 1096 Ts | Short OFDM symbol subcarrier spacing | 30 kHz |
| CP length of short OFDM symbol | 72 Ts | | |
| # of long OFDM symbols in subframe (M) | 14 | # of subcarriers per RB for long OFDM symbol | 12 |
| Length of long OFDM symbol | 2116 Ts | Long OFDM symbol subcarrier spacing | 15 kHz |
| CP length of long OFDM symbol | 68 Ts | | |

In Table 1, Ts is 1/(15000×2048) seconds as aforementioned. The EDC system using the subframe format of Table 1 reduces the amount of resources allocated for cyclic prefix to half of that used in the LTE/LTE-A system. The LTE/LTE-A system allocates about 6.7% of the entire radio resource for cyclic prefix while the EDC system using the downlink frame format of Table 1 allocates 3.3% of the entire radio resource for cyclic prefix. In this EDC system, the cyclic prefix occupies about 2.3 μsec per OFDM symbol which is so short as to weaken the robustness to the delay spread as compared to that of the LTE/LTE-A system. However, the reduction of the length of the cyclic prefix increases the amount of resources available for data transmission in the subframe. More particularly in the situation requiring low transmit power, the shortened cyclic prefix of the EDC system causes no problem.

Table 2 shows a downlink frame format for use in an EDC system with X=1 and Y=1 according to a second exemplary embodiment of the present invention.

TABLE 2

| Time Domain | | Frequency Domain | |
| --- | --- | --- | --- |
| Subframe length | 1 msec | RB bandwidth | 180 kHz |
| # of short OFDM symbols in Subframe (N) | 1 | # of subcarriers per RB for short OFDM symbol | 9 |
| Length of short OFDM symbol | 1572 Ts | Short OFDM symbol subcarrier spacing | 20 kHz |
| CP length of short OFDM symbol | 36 Ts | | |
| # of long OFDM symbols in subframe (M) | 14 | # of subcarriers per RB for long OFDM symbol | 12 |
| Length of long OFDM symbol | 2082 Ts | Long OFDM symbol subcarrier spacing | 15 kHz |
| CP length of long OFDM symbol | 34 Ts | | |

In Table 2, Ts is 1/(15000×2048) seconds as aforementioned. The EDC system using the subframe format of Table 2 reduces the amount of resources allocated for cyclic prefix to ¼ of that used in the LTE/LTE-A system. The LTE/LTE-A system allocates about 6.7% of the entire radio resource for cyclic prefix while the EDC system using the downlink frame format of Table 2 allocates 1.7% of the entire radio resource for cyclic prefix. In this EDC system, the cyclic prefix occupies about 1.2 μsec per OFDM symbol which is so short as to weaken the robustness to the delay spread as compared to that of the LTE/LTE-A system. However, the reduction of the length of the cyclic prefix increases the amount of resources available for data transmission in the subframe. More particularly in the situation requiring low transmit power, the shortened cyclic prefix of the EDC system causes no problem. The subframe designed for use in the EDC system according to one of the first and second exemplary embodiments of the present invention includes N=1 short OFDM symbols and M=14 long OFDM symbols. The short OFDM symbol arranged per subframe can be used to carry a Reference Signal (RS) for channel measurement at the receiver. The receiver measures the radio channel with the reference signal for signal decoding on data channel and channel state information feedback.

Regarding the reference signal transmission, it is required for the cells to avoid using the same radio resource for reference signal transmission. This aims to improve the UE's reference signal reception performance per cell. In order to satisfy the requirements in the system where a subframe includes one short OFDM symbol and a plurality of long OFDM symbols and the short OFDM symbol is used for reference signal transmission according to one of the first and second exemplary embodiments of the present invention, it is proposed for the cells to transmit the short OFDM symbol at different positions in the same subframe.

Figure 7:
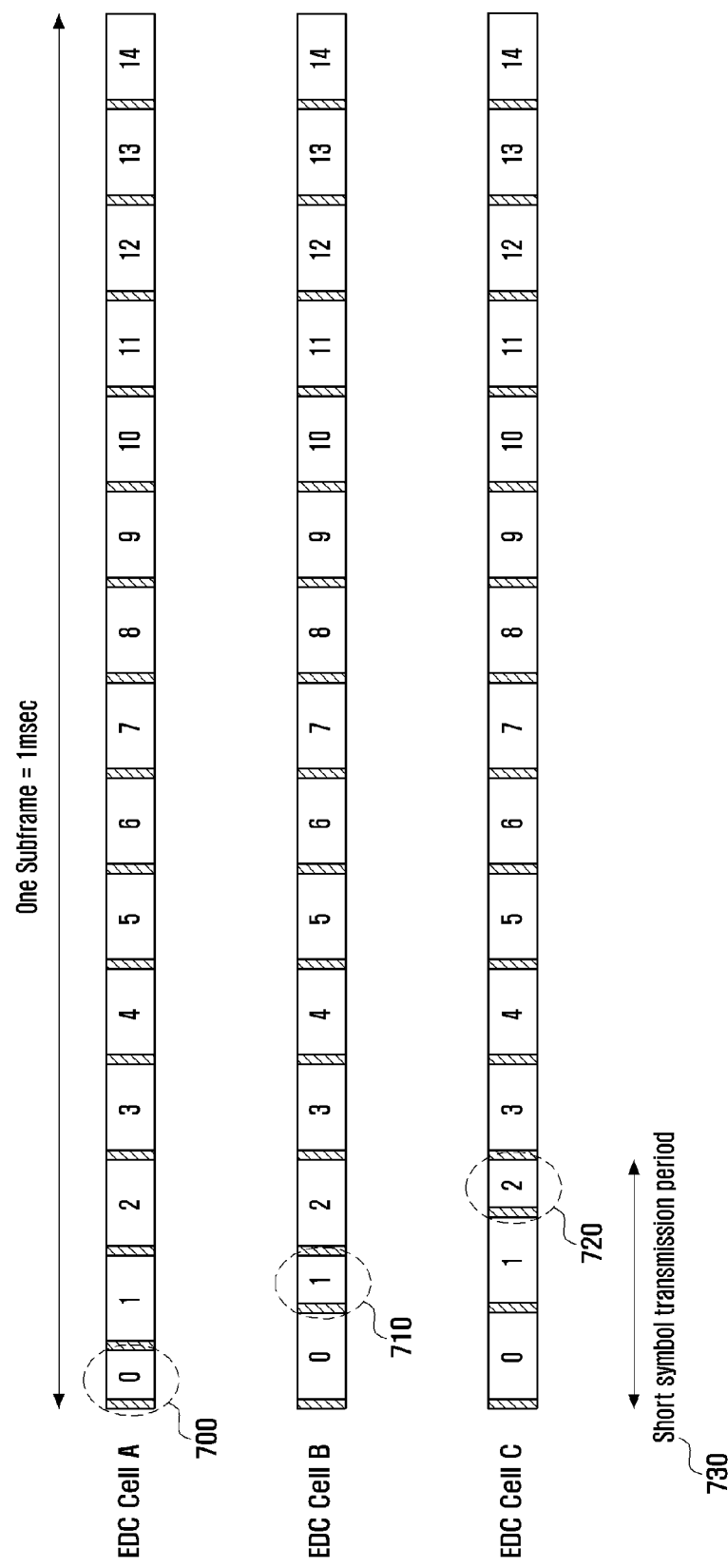
FIG. 7 is a diagram illustrating a downlink frame structure for use in an EDC system according to an exemplary embodiment of the present invention.

FIG. 7 is a diagram illustrating a downlink frame structure for use in an EDC system according to an exemplary embodiment of the present invention.

FIG. 7 shows an exemplary downlink frame structure in which the short OFDM symbols of the femto cells A, B, and C are located at different positions in a subframe for the EDC transmission mode according to one of the first and second exemplary embodiments of the present invention.

Referring to FIG. 7, the cell transmits a short OFDM symbol 700 at the first OFDM symbol in the subframe. Meanwhile, the cells B and C transmit short OFDM symbols 710 at the respective second and third OFDM symbols. When configuring the positions of the short OFDM symbols of different cells, it is important to configure the range. That is, it is required to configure a short symbol transmission period 730 to limit the transmission of the short OFDM symbol 720 in that range. The short symbol transmission period 730 proposed by exemplary embodiments of the present invention can be determined by the following methods. For example, if the short symbol transmission period 730 is set to 3, the short OFDM symbol is arranged at the third OFDM symbol position of the subframe.

1. Set the short symbol transmission period to a predetermined value.
2. The eNB determines and notifies the short symbol transmission period to the UE through RRC signaling.
3. The eNB determines and notifies the short symbol transmission period to the UE through physical layer signaling.

When multiple cells operating in EDC mode exist, it is necessary to determine the positions of the respective short OFDM symbols in the range of the short symbol transmission period. Exemplary embodiments of the present invention propose various methods as follows:

1. The eNB determines and notifies the short OFDM symbol positions to the UE through RRC signaling.
2. The UE obtains a value by performing modulo operation on the cell ID of each cell (i.e., remainder obtained by dividing the cell ID by the short symbol transmission period) and determines the short OFDM symbol transmission position based on the value.
3. The UE shifts the position using the value obtained through the modulo operation on the cell ID of each cell one by one in time from the initial position.

Table 3 shows a downlink frame format for use in the EDC system with X=1 and Y=1 according to a third exemplary embodiment of the present invention.

TABLE 3

| Time Domain | | Frequency Domain | |
|---|---|---|---|
| Subframe length | 1 msec | RB bandwidth | 180 kHz |
| # of short OFDM symbols in Subframe (N) | 2 | # of subcarriers per RB for short OFDM symbol | 3 |
| Length of short OFDM symbol | 576 Ts | Short OFDM symbol subcarrier spacing | 60 kHz |
| CP length of short OFDM symbol | 64 Ts | | |
| # of long OFDM symbols in subframe (M) | 14 | # of subcarriers per RB for long OFDM symbol | 12 |
| Length of long OFDM symbol | 2112 Ts | Long OFDM symbol subcarrier spacing | 15 kHz |
| CP length of long OFDM symbol | 64 Ts | | |

In Table 3, Ts is 1/(15000×2048) seconds as aforementioned. The EDC system using the subframe format of Table 3 reduces the amount of resources allocated for cyclic prefix to ½ of that used in the LTE/LTE-A system. The LTE/LTE-A system allocates about 6.7% of the entire radio resource for cyclic prefix while the EDC system using the downlink frame format of Table 3 allocates 3.3% of the entire radio resource for cyclic prefix. In this EDC system, the cyclic prefix occupies about 2.1 μsec per OFDM symbol which is so short as to weaken the robustness to the delay spread as compared to that of the LTE/LTE-A system. However, the reduction of the length of the cyclic prefix increases the amount of resources available for data transmission in the subframe. More particularly, in the situation requiring low transmit power, the shortened cyclic prefix of the EDC system causes no problem.

The subframe designed for use in the EDC system according to this exemplary embodiment includes N=2 short OFDM symbols and M=14 long subframes. The two short OFDM symbols per EDC cell can be used to carry a Reference Signal (RS) for channel measurement at the receiver. In this exemplary embodiment, it is proposed to arrange the short OFDM symbols of the different cells at different positions in a subframe. Here, it is preferred to maintain the interval between the short OFDM symbols of different cells. This aims to allow the UE to estimate channels using the same channel estimator for different cells.

Figure 8:
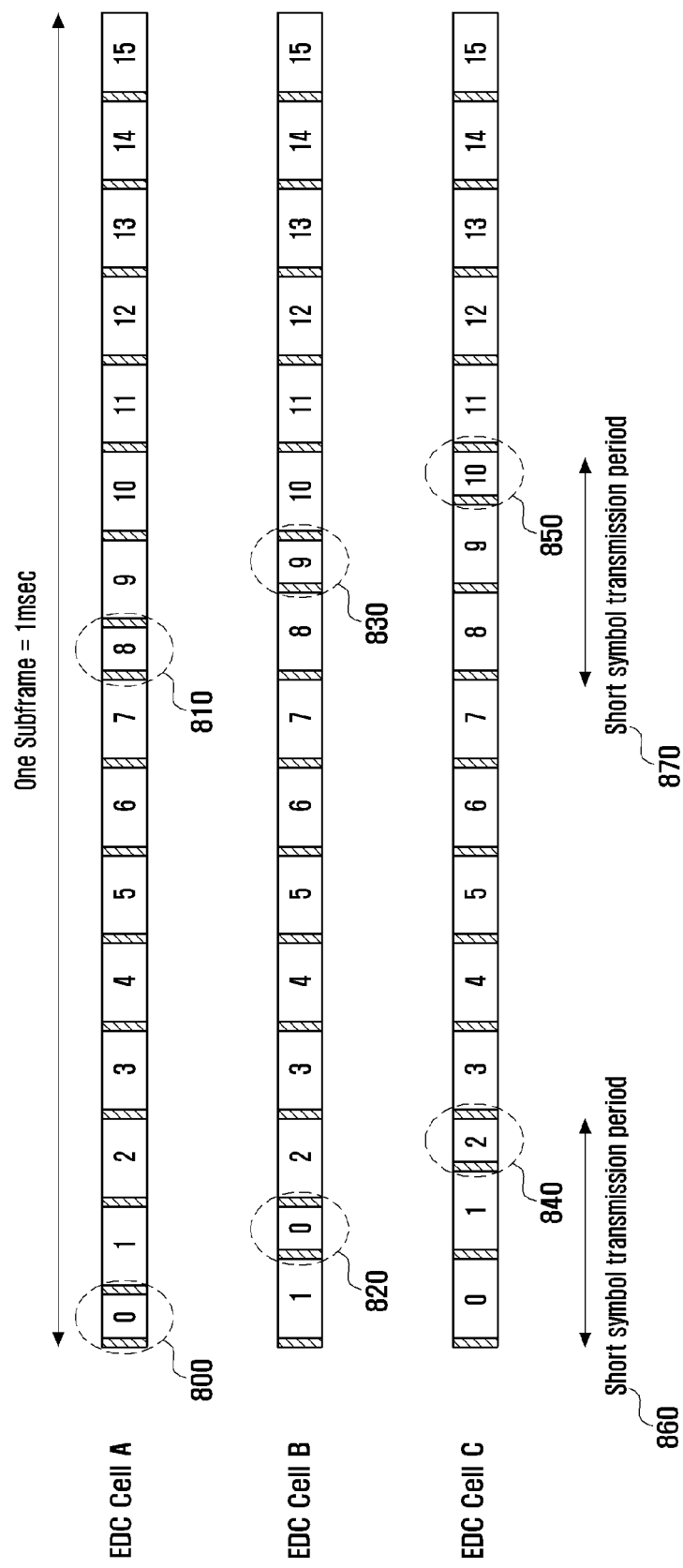
FIG. 8 is a diagram illustrating a downlink frame structure for use in an EDC system according to an exemplary embodiment of the present invention.

FIG. 8 is a diagram illustrating a downlink frame structure for use in an EDC system according to an exemplary embodiment of the present invention.

FIG. 8, an exemplary downlink frame structure in which the short OFDM symbols of the femto cells A, B, and C are arranged at different positions in a subframe for the EDC transmission mode according to the third exemplary embodiment of the present invention is illustrated.

Referring to FIG. 8, in case the short OFDM symbols 800, 810, 820, 830, 840, and 850 paired per EDC cell are used for reference signal transmission, it is advantageous to transmit the short OFDM symbols 800, 810, 820, 830, 840, and 850 as distributed in a subframe. This is because it is advantageous for the UE to receive the reference signals over a long time duration rather than a short time duration by taking notice of the time-varying radio channel due to the movement of the UE. The two short OFDM symbols per EDC cell are arranged with a distance of 0.5 msec regardless of their positions in the subframe. That is, in the downlink frame structure of each EDC system, the short OFDM symbols are arranged at an interval of 0.5 msec in the time domain.

Similar to the above-described exemplary embodiments, the short OFDM symbols 800, 810, 820, 830, 840, and 850 are transmitted at different positions with the exception that two short symbol transmission periods 860 and 870 are used due to the existence of the two short OFDM symbols in a subframe. A subframe consists of two time slots, and the two short OFDM symbols are positioned in the two different time slots. Here, the short symbol transmission periods 860 and 870 are applied to the respective time slots.

Table 4 shows a downlink frame format for use in an EDC system with X=1 and Y=1 according to a fourth exemplary embodiment of the present invention.

TABLE 4

| Time Domain | | Frequency Domain | |
|---|---|---|---|
| Subframe length | 1 msec | RB bandwidth | 180 kHz |
| # of short OFDM symbols in Subframe (N) | 3 | # of subcarriers per RB for short OFDM symbol | 3 |
| Length of short OFDM symbol | 544 Ts, 542 Ts, 542 Ts | Short OFDM symbol subcarrier spacing | 60 kHz |
| CP length of short OFDM symbol | 32 Ts, 30 Ts, 30 Ts | | |
| # of long OFDM symbols in subframe (M) | 14 | # of subcarriers per RB for long OFDM symbol | 12 |
| Length of long OFDM symbol | 2078 Ts | Long OFDM symbol subcarrier spacing | 15 kHz |
| CP length of long OFDM symbol | 30 Ts | | |

In Table 4, Ts is 1/(15000×2048) seconds as aforementioned. The EDC system using the subframe format of Table 4 reduces the amount of resources allocated for cyclic prefix to ¼ of that used in the LTE/LTE-A system. The LTE/LTE-A system allocates about 6.7% of the entire radio resource for cyclic prefix while the EDC system using the downlink frame format of Table 4 allocates 1.7% of the entire radio resource for cyclic prefix. In this EDC system, the cyclic prefix occupies about 1.0 μsec per OFDM symbol which is so short as to weaken the robustness to the delay spread as compared to that of the LTE/LTE-A system. However, the reduction of the length of the cyclic prefix increases the amount of resources available for data transmission in the subframe. More particularly in the situation requiring low transmit power, the shortened cyclic prefix of the EDC system causes no problem. The subframe for use in the EDC system according to this exemplary embodiment can use the short OFDM symbol with one of three cyclic prefixes that are different in length.

The subframe designed for use in the EDC system according to this exemplary embodiment includes N=3 short OFDM symbols and M=14 OFDM symbols. The three OFDM symbols per EDC cell can be used to carry the reference signals for channel measurement at the receiver. In case that three short OFDM symbols are used to carry the reference signals in the EDC system according to this exemplary embodiment, the principle of the exemplary embodiment of FIG. 8 is applied in the same manner, and thus the description is directed to the case where the eNB transmits a physical layer control signal to the UE herein.

Figure 9:
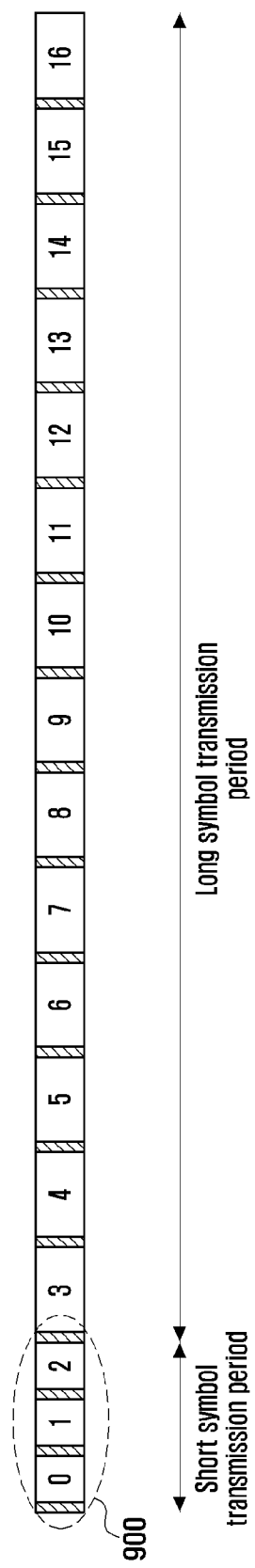
FIG. 9 is a diagram illustrating a downlink frame structure for use in an EDC system according to an exemplary embodiment of the present invention.

FIG. 9 is a diagram illustrating a downlink frame structure for use in an EDC system according to an exemplary embodiment of the present invention.

Referring to FIG. 9, an exemplary downlink frame structure in which physical layer control signals are transmitted at three short OFDM symbols per femto cell operating in EDC mode according to a fourth exemplary embodiment is illustrated.

The physical layer control signal is the signal carrying data and control information necessary for the operation of the mobile communication system, and the control information can be updated at every subframe. The control signal can be transmitted in the three consecutive short OFDM symbols 900 at the beginning of the subframe. The three short OFDM symbols 900 are used for transmitting control channels necessary for the UE to receive the data signals transmitted in the long OFDM symbols. The control information can include the frequency and time resources, modulation scheme, data rate, and number of retransmissions for the data signal.

Table 5 shows a downlink frame format for use in an EDC system with X=1 and Y=1 according to a fifth exemplary embodiment of the present invention.

TABLE 5

| Time Domain | | Frequency Domain | |
|---|---|---|---|
| Subframe length | 1 msec | RB bandwidth | 180 kHz |
| # of short OFDM symbols in Subframe (N) | 1 | # of subcarriers per RB for short OFDM symbol | 6 |
| Length of short OFDM symbol | 1152 Ts, | Short OFDM symbol subcarrier spacing | 30 kHz |
| CP length of short OFDM symbol | 128 Ts | | |
| # of long OFDM symbols in subframe (M) | 7 | # of subcarriers per RB for long OFDM symbol | 24 |
| Length of long OFDM symbol | 4224 Ts | Long OFDM symbol subcarrier spacing | 7.5 kHz |
| CP length of long OFDM symbol | 128 Ts | | |

In Table 5, Ts is 1/(15000×2048) seconds as aforementioned. The EDC system using the subframe format of Table 5 reduces the amount of resources allocated for cyclic prefix to ½ of that used in the LTE/LTE-A system. The LTE/LTE-A system allocates about 6.7% of the entire radio resource for cyclic prefix while the EDC system using the downlink frame format of Table 5 allocates 3.3% of the entire radio resource for cyclic prefix. In this EDC system, the cyclic prefix occupies about 4.2 μsec per OFDM symbol which is a similar level of robustness to the delay spread as compared to that of the LTE/LTE-A system. The reduction of the length of the cyclic prefix increases the amount resources available for data transmission in the subframe.

Figure 10:
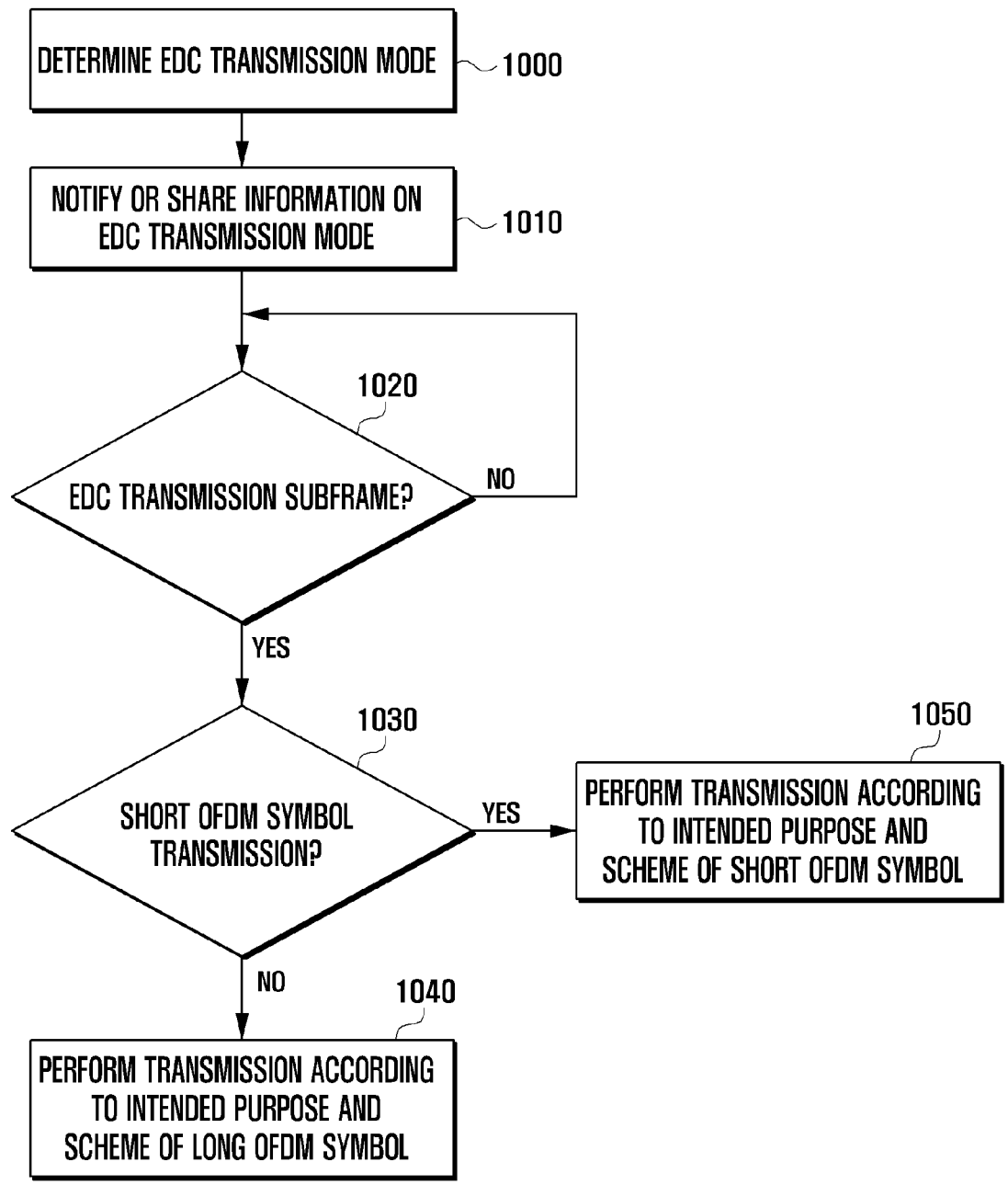
FIG. 10 is a flowchart illustrating an evolved Node B (eNB) procedure for downlink transmission in an EDC system according to an exemplary embodiment of the present invention.

FIG. 10 is a flowchart illustrating an eNB procedure for downlink transmission in an EDC system according to an exemplary embodiment of the present invention. In this exemplary embodiment, the downlink transmission procedures of the macro and femto cells are performed in a similar manner.

Referring to FIG. 10, the eNB determines the EDC transmission mode at step 1000. At this time, the eNB can determine the position and usage of the short OFDM symbol according to the EDC transmission mode. Here, the eNB can be configured to operate in the EDC transmission mode. The eNB can determine the EDC transmission mode through communication between macro and femto cells. That is, the femto cell can notify the macro cell of the determination of use of the EDC transmission mode such that the macro cell confirms the use of the EDC transmission mode. Also, the macro cell can notify the femto cell of the determination of use of the EDC transmission mode such that the femto cell confirms the use of the EDC transmission mode. The eNB shares the information on the EDC transmission mode with the UE at step 1010. The information on the EDC transmission mode can be defined between the eNB and the UE in the initial EDC system implementation stage. In this case, it becomes difficult to change the defined transmission mode. Also, the EDC transmission mode can be defined by the eNB and notified to the UE through higher layer signaling. It is also possible to notify the UE of the determination of the use of an LTE/LTE-A system with a relatively large service coverage area.

After sharing the information on the EDC transmission mode between the eNB and the UE at step 1010, the eNB can perform EDC transmission to the UE. If it is determined to transmit signals to the UE in the EDC transmission mode at step 1020, the eNB generates the signals for short and long OFDM symbols in the EDC subframe. The eNB determines whether the current time duration is for short OFDM symbol transmission or long OFDM symbol transmission at step 1030. If it is determined that the current time is for short OFDM symbol transmission, the eNB transmits the short OFDM symbol according to the indented purpose and scheme at step 1050. At this time, the eNB can transmit the reference signal or control signal in the short OFDM symbol. Otherwise, if it is determined that the current time is for long OFDM symbol transmission, the eNB transmits the long OFDM symbol according to the intended purpose and scheme at step 1040. At this time, the eNB can transmit a data signal in the long OFDM symbol.

Figure 11:
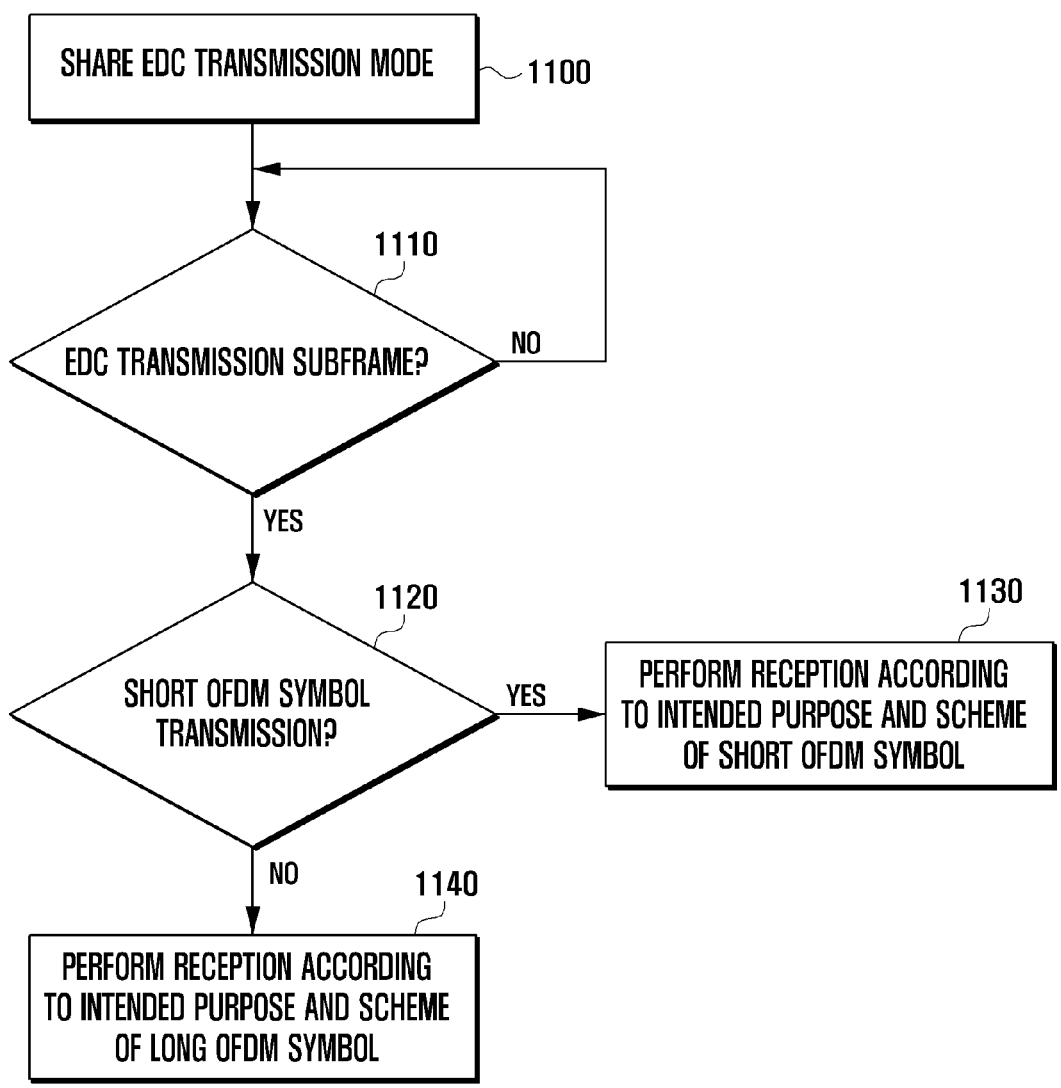
FIG. 11 is a flowchart illustrating a User Equipment (UE) procedure for downlink reception in an EDC system according to an exemplary embodiment of the present invention.

FIG. 11 is a flowchart illustrating a UE procedure for downlink reception in an EDC system according to an exemplary embodiment of the present invention.

Referring to FIG. 11, the UE shares the information on the EDC transmission mode with the eNB at step 1100. The EDC transmission mode information can be shared by transmitting the information to the eNB or using a predetermined EDC system configuration. This corresponds to step 1010 of the eNB procedure of FIG. 10. At this time, the UE determines the EDC subframe and position and usage of the short OFDM symbol in the EDC subframe. If the EDC subframe is received at step 1110, the UE determines whether the current position corresponds to the short OFDM symbol at step 1120. If it is determined that the current position corresponds to the short OFDM symbol, the UE receives the short OFDM symbol according to the intended purpose and scheme at step 1130. At this time, the UE can receive the reference signal or control signal in the short OFDM symbol. Otherwise, if it is determined that the current position corresponds to the long OFDM symbol, the UE receives the long OFDM symbol according to the intended purpose and scheme at step 1140. At this time, the UE can receive data signal in the long OFDM symbol.

Figure 12:
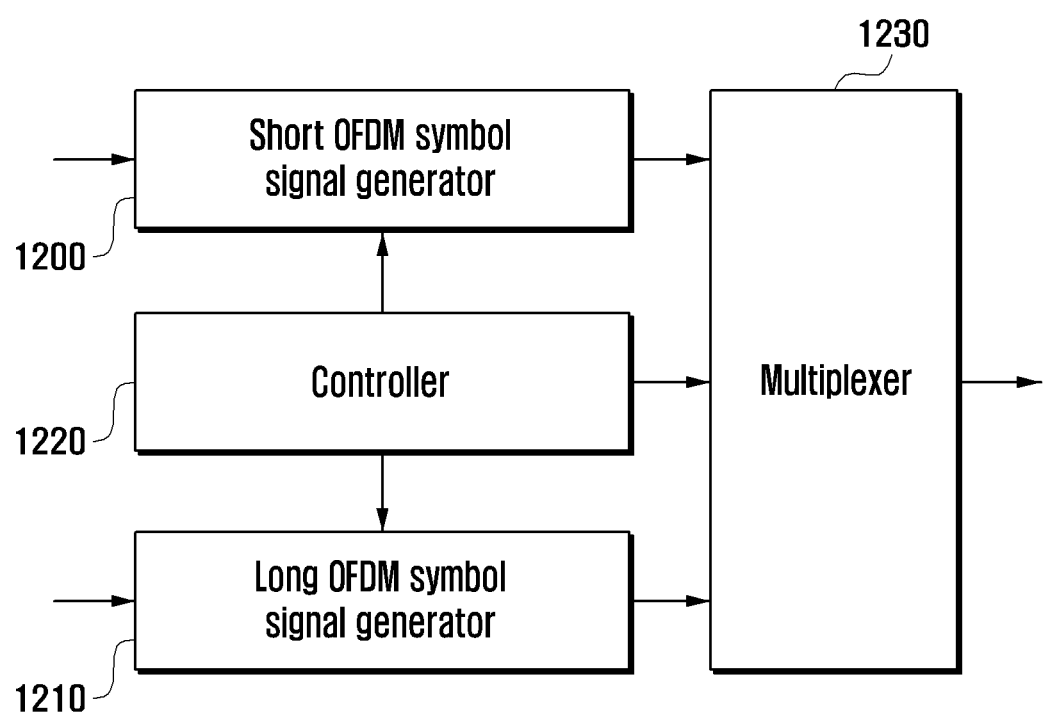
FIG. 12 is a block diagram illustrating a configuration of a downlink transmission device of an eNB of an EDC system according to an exemplary embodiment of the present invention.

FIG. 12 is a block diagram illustrating a configuration of a downlink transmission device of an eNB of an EDC system according to an exemplary embodiment of the present invention.

Referring to FIG. 12, the downlink transmission device of the eNB includes a short OFDM symbol signal generator 1200, a long OFDM symbol signal generator 1210, a controller 1220, and a multiplexer 12230.

The short OFDM symbol signal generator 1200 generates the signal for short OFDM symbol. The long OFDM symbol signal generator 1210 generates the signal for long OFDM symbol. Here, the information input to the short and long OFDM symbol signal generators 1200 and 1210 is determined depending on whether it is carried in the short or long OFDM symbol. For example, the control signal or reference signal information is input to the short OFDM symbol signal generator 1200 while the data signal information is input to the long OFDM symbol signal 1210. That is, the short OFDM symbol signal generator 1200 generates the reference signal or control signal, and the long OFDM symbol signal generator 1200 generates the data signal.

The controller 1220 controls the short and long OFDM symbol signal generator 1200 and 1210 to generate appropriate signals. The controller 1220 controls the short and long OFDM symbol signal generators 1200 and 1210 to input the generated signals to the multiplexer 1230. The multiplexer 1230 multiplexes the output signals of the short and long OFDM symbol signal generators 1200 and 1210 into an EDC subframe under the control of the controller 12290. The multiplexed short and long OFDM symbols are transmitted to the UE in the subframe.

In the downlink transmission device according to an exemplary embodiment, the controller 1220 controls such that the signals to be mapped to at least one short OFDM symbol and a plurality of long OFDM symbols constituting an EDC subframe are generated in a predetermined EDC transmission mode. Here, the short and long OFDM symbols are arranged at the positions corresponding to multiples of Ts in the EDC subframe. The cyclic prefix for the EDC subframe is shorter than that of the LTE/LTE-A subframe in time and attached at the beginning of the short and long OFDM symbols. The downlink signal duration for the signal of the EDC subframe dispensed to the short and long OFDM symbols. The controller 1220 also controls such that the signals mapped to the short and long OFDM symbols are transmitted at the predetermined positions in the EDC subframe according to the predetermined EDC transmission mode. The controller 1220 transmits the short OFDM symbol carrying the reference signal or control signal and the long OFDM symbols carrying the data signals.

Figure 13:
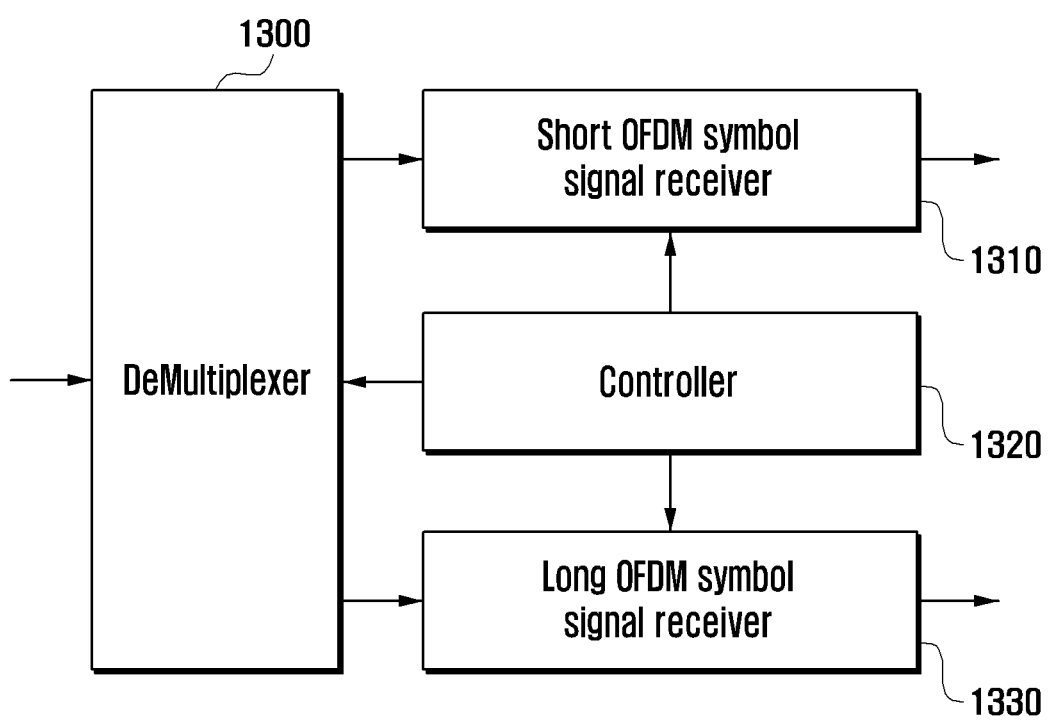
FIG. 13 is a diagram illustrating a configuration of a downlink reception device of a UE of an EDC system according to an exemplary embodiment of the present invention.

FIG. 13 is a diagram illustrating a configuration of a downlink reception device of a UE of an EDC system according to an exemplary embodiment of the present invention.

Referring to FIG. 13, the UE includes a demultiplexer 1300, a short OFDM symbol signal receiver 1310, a controller 1320, and a long OFDM symbol signal receiver 1320. The demultiplexer 1300 demultiplexes the received signal under the control of the controller 1320. That is, the demultiplexer 1300 separates the short and long OFDM symbols transmitted at different positions in the subframe.

The short OFDM symbol signal receiver 1310 processes the short OFDM symbol signal demultiplexed by the demultiplexer 1300. The long OFDM symbol signal receiver 1330 processes the long OFDM symbol signal demultiplexed by the demultiplexer 1300. The short and long OFDM symbol signal receivers 1310 and 1330 operate differently depending on the EDC system implementation and whether a signal to be processed is the control signal, reference signal, or data signal.

In the downlink reception device according to an exemplary embodiment, the controller 1320 determines the EDC subframe and the position of the short OFDM symbol in the EDC subframe according to a predetermined EDC transmission mode. Here, the short and long OFDM symbols are arranged at positions corresponding to multiples of Ts in the EDC subframe. The cyclic prefix for the EDC subframe is shorter than that of the LTE/LTE-A subframe in time and attached at the beginning of the short and long OFDM symbols. The length of the cyclic prefix of the EDC subframe is a multiple of Ts and attached to the short and long OFDM symbols. The controller 1320 controls such that the signals mapped to the short and long OFDM symbols are received based on the position information. Here, the controller 1320 controls such that the reference signal or the control signal is received at the short OFDM symbol and the data signal at the long OFDM symbols.

Although the description is directed to the subframe designed for use in an EDC system in which the control signal or reference signal is transmitted in at least one short OFDM symbol and the data signal in a plurality of long OFDM symbols, the present invention is not limited thereto. That is, the present invention can be applied to a system operating in a different way as compared to the first to fifth exemplary embodiments of the present invention. For example, the present invention can be used for synchronization signal transmission. The present invention can be implemented in number of embodiments.

As described above, the downlink transmission/reception method and apparatus according to exemplary embodiments of the present invention are capable of improving a data rate by designing the downlink frame structure optimized for use in the femto cells in a mobile communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A downlink transmission method of a base station in a mobile communication system including at least one small base station and a macro base station, comprising:
    generating signals to be mapped to at least one first symbol and a plurality of second symbols in a first type subframe for the small base station which differs from a second type subframe for the macro base station in frequency; and
    transmitting the signals to be mapped to the at least one first symbol and the second symbols at predetermined positions in the first type subframe,
    wherein a length of the first symbol is different from a length of the second symbol and lengths of symbols in the second type subframe are identical,
    wherein the first type subframe and second type subframe are transmitted simultaneously.

2. The method of claim 1, wherein each of the first and second symbols comprises a second type cyclic prefix having a length shorter than a first type cyclic prefix of a symbol carried in the second type subframe.

3. The method of claim 2, wherein the length of the second type cyclic prefix is a multiple of a value obtained by an equation of $Ts=1/(15000\times2048)\approx32.6\times10^{-9}$ sec, and the length of each of the first and second symbols is a multiple of the value obtained by the equation.

4. The method of claim 1, wherein the transmitting comprises mapping one of a reference signal and a control signal to the first symbol and mapping a data signal to the second symbols.

5. A downlink reception method of a terminal in a mobile communication system including at least one small base station and a macro base station, comprising:
    determining a first type subframe for the small base station which differs from a second type subframe for the macro base station in frequency and position of at least one first symbol in the first type subframe; and
    receiving signals mapped to the at least one first symbol and a plurality of second symbols in the first type subframe according to the determined position,
    wherein a length of the first symbol is different from a length of the second symbol and lengths of symbols in the second type subframe are identical, and
    wherein the first type subframe and second type subframe are transmitted simultaneously.

6. The method of claim 5, wherein each of the first and second symbols comprises a second type cyclic prefix having a length shorter than a first type cyclic prefix of a symbol carried in the second type subframe.

7. The method of claim 6, wherein the length of the second type cyclic prefix is a multiple of a value obtained by an equation of $Ts=1/(15000\times2048)\approx32.6\times10^{-9}$ sec, and the length of each of the first and second symbols is a multiple of the value obtained by the equation.

8. The method of claim 5, wherein receiving comprises extracting one of reference signal and control signal from the first symbol and data signal from the second symbols.

9. A downlink transmission apparatus of a base station in a mobile communication system including at least one small base station and a macro base station, comprising:
    a transceiver configured to transmit and receive a signal; and
    a controller configured to generate signals to be mapped to at least one first symbol and a plurality of second symbols in a first type subframe for the small base station which differs from a second type subframe for the macro base station in frequency, to transmit the signals to be mapped to the at least one first symbol and the second symbols at predetermined positions in the first type subframe,
    wherein a length of the first symbol is different from a length of the second symbol and lengths of symbols in the second type subframe are identical,
    wherein the first type subframe and second type subframe are transmitted simultaneously.

10. The apparatus of claim 9, wherein each of the first and second symbols comprises a second type cyclic prefix having a length shorter than a first type cyclic prefix of a symbol carried in the second type subframe.

11. The apparatus of claim 10, wherein the length of the second type cyclic prefix is a multiple of a value obtained by an equation of $Ts =1/(15000\times2048)\approx32.6\times10^{-9}$ sec, and the length of each of the first and second symbols is a multiple of the value obtained by the equation.

12. The apparatus of claim 9, wherein the controller is configured to map one of a reference signal and a control signal to the first symbol and map a data signal to the second symbols.

13. A downlink reception apparatus of a terminal in a mobile communication system including at least one small base station and a macro base station, comprising:
    a transceiver configured to transmit and receive a signal; and
    a controller configured to determine a first type subframe for the small base station which differs from a second type subframe for the macro base station in frequency and position of at least one first symbol in the first type subframe, and to receive signals mapped to the at least one first symbol and a plurality of second symbols in the first type subframe according to the determined position, wherein a length of the first symbol is different from a length of the second symbol and lengths of symbols in the second type subframe are identical, and wherein the first type subframe and second type subframe are transmitted simultaneously.

14. The apparatus of claim 13, wherein each of the first and second symbols comprises a second type cyclic prefix having a length shorter than a first type cyclic prefix of a symbol carried in the second type subframe.

15. The apparatus of claim 14, wherein the length of the second type cyclic prefix is a multiple of a value obtained by an equation of $T_s = 1/(15000 \times 2048) \approx 32.6 \times 10^{-9}$ sec, and the length of each of the first and second symbols is a multiple of the value obtained by the equation.

16. The apparatus of claim 13, wherein the controller is configured to extract one of reference signal and control signal from the first symbol and data signal from the second symbols.

\* \* \* \* \*